(12) United States Patent
Gao et al.

(10) Patent No.: US 12,540,377 B2
(45) Date of Patent: Feb. 3, 2026

(54) RARE EARTH ALUMINUM ALLOY POWDER APPLICABLE FOR ADDITIVE MANUFACTURING AND PREPARATION METHOD THEREOF

(71) Applicant: SHANGHAI JIAO TONG UNIVERSITY, Shanghai (CN)

(72) Inventors: Haiyan Gao, Shanghai (CN); Haiyang Lv, Shanghai (CN); Mengmeng Wang, Shanghai (CN); Peng Peng, Shanghai (CN); Yun Wu, Shanghai (CN); Chi Zhang, Shanghai (CN); Min Li, Shanghai (CN); Yufei Wang, Shanghai (CN); Jun Wang, Shanghai (CN); Baode Sun, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 436 days.

(21) Appl. No.: 18/163,859

(22) Filed: Feb. 2, 2023

(65) Prior Publication Data

US 2023/0175102 A1    Jun. 8, 2023

Related U.S. Application Data

(63) Continuation of application No. PCT/CN2021/114279, filed on Aug. 24, 2021.

(30) Foreign Application Priority Data

Dec. 30, 2020   (CN) .......................... 202011605054.2

(51) Int. Cl.
*C22C 21/00*    (2006.01)
*B22F 1/05*     (2022.01)
(Continued)

(52) U.S. Cl.
CPC ................ *C22C 21/00* (2013.01); *B22F 1/05* (2022.01); *B22F 1/065* (2022.01); *B22F 9/082* (2013.01);
(Continued)

(58) Field of Classification Search
CPC ........ C22C 1/0416; C22C 1/026; B22F 9/082
See application file for complete search history.

(56) References Cited

U.S. PATENT DOCUMENTS 10,062,503 B2   8/2018  Nagata et al.
10,717,131 B2   7/2020  Nagata et al.
(Continued)

FOREIGN PATENT DOCUMENTS

CN        1254028 A       5/2000
CN      107262730 A  * 10/2017   .............. B22F 9/082
(Continued)

*Primary Examiner* — Sally A Merkling
*Assistant Examiner* — Austin Pollock

(57) ABSTRACT

A method for preparing a rare earth aluminum alloy powder applicable for additive manufacturing includes: heating and melting aluminum ingots into an aluminum melt; adding required alloy elements to the aluminum melt to obtain an alloy melt in which the alloy elements are present in the following preset percentages by weight: 1.00% to 10.00% of Ce, 0.05% to 8.00% of Mg, 0.10% to 7.50% of Y, 0.10% to 2.50% of Zr, less than 0.1% of impurities, and the balance aluminum; leading out the alloy melt through a fluid guiding pipe, and impacting the alloy melt with a high-pressure gas flow so that the alloy melt is atomized into fine droplets under an action of surface tension, and solidified into spherical alloy powder; and collecting the spherical alloy powder in a vacuum collector, and screening and drying the spherical alloy powder to obtain the rare earth aluminum alloy powder.

4 Claims, 2 Drawing Sheets

(51) Int. Cl.
    *B22F 1/065*         (2022.01)
    *B22F 9/08*           (2006.01)
    *B22F 10/28*         (2021.01)
    *B33Y 70/00*         (2020.01)
    *C22C 1/02*          (2006.01)
    *C22C 1/04*          (2023.01)
    *C22C 21/06*         (2006.01)

(52) U.S. Cl.
    CPC .............. *B33Y 70/00* (2014.12); *C22C 1/026* (2013.01); *C22C 1/0416* (2013.01); *C22C 21/06* (2013.01); *B22F 2009/0824* (2013.01); *B22F 10/28* (2021.01); *B22F 2301/052* (2013.01); *B22F 2304/10* (2013.01)

(56) References Cited

U.S. PATENT DOCUMENTS

| | | |
|---|---|---|
| 11,401,585 B2 | 8/2022 | Gong et al. |
| 2020/0122237 A1* | 4/2020 | Kemper ................ C21C 7/0087 |
| 2021/0008629 A1* | 1/2021 | St-Laurent .............. B22F 1/052 |
| 2022/0119926 A1* | 4/2022 | Chehab ................ B23K 26/342 |

FOREIGN PATENT DOCUMENTS

| | | | | | |
|---|---|---|---|---|---|
| CN | 108220693 | A | | 6/2018 | |
| CN | 109338182 | A | | 2/2019 | |
| CN | 110396627 | A | * | 11/2019 | ............ B33Y 70/00 |
| CN | 111321326 | A | | 6/2020 | |
| CN | 111378875 | A | | 7/2020 | |
| CN | 111411268 | A | | 7/2020 | |
| CN | 112795818 | A | | 5/2021 | |
| CN | 112831694 | A | | 5/2021 | |
| CN | 113136505 | A | | 7/2021 | |
| JP | H01275732 | A | | 11/1989 | |
| JP | 2004001085 | A | * | 1/2004 | ............. B22F 9/082 |
| WO | WO-2020125553 | A1 | * | 6/2020 | ............. B33Y 70/00 |
| WO | WO-2020152427 | A1 | * | 7/2020 | .............. B22F 10/22 |

* cited by examiner

RARE EARTH ALUMINUM ALLOY POWDER APPLICABLE FOR ADDITIVE MANUFACTURING AND PREPARATION METHOD THEREOF

CROSS-REFERENCE TO RELATED APPLICATIONS

This application is a continuation of International Patent Application No. PCT/CN2021/114279 with a filing date of Aug. 24, 2021, designating the United States, now pending, and further claims priority to Chinese Patent Application No. 202011605054.2 with a filing date of Dec. 30, 2020. The content of the aforementioned applications, including any intervening amendments thereto, are incorporated herein by reference.

TECHNICAL FIELD

This application relates to the technical field of additive manufacturing, and in particular to a rare earth aluminum alloy powder applicable for additive manufacturing and a preparation method thereof.

BACKGROUND ART

Additive Manufacturing (AM), also known as 3D printing, is a manufacturing process that integrates computer-aided design, material processing and molding technologies to produce, based on digital model files, three-dimensional solid parts identical to corresponding digital models from special-purpose materials in a layer by layer manner through software and numerical control systems. AM has the features of simple process, short processing cycle and high material utilization rate. This makes it possible to manufacture complex structural parts which cannot be realized in the past due to the constraints of traditional manufacturing methods, and topological optimization of the model structure can be carried out according to the needs.

It is found by searching that the Chinese patent application No. 201811093773.3 discloses an aluminum alloy powder for 3D printing and a preparation method thereof. In the preparation method, the powder is only directed to the powder bed selective laser sintering process, and cannot be widely applied in various manufacturing processes; the Mn element contained in the powder may reduce the electrical conductivity of the alloy; and the patent discloses that the alloy has a tensile strength of 450 MP at room temperature, but does not disclose its performance at high temperature. Rare earth elements have been added to aluminum alloy as effective refining and strengthening elements. The Chinese patent application No. 202010356881.6 provides an Al-RE-Y—Mg alloy and a preparation method thereof. The disclosed Al-RE-Y—Mg alloy is applicable for pressure/gravity casting, and has high strength, toughness, hot-pressing resistance, high thermal conductivity and corrosion resistance. However, the alloy has a strength of lower than 260 MPa at room temperature, but a strength of lower than 150 MPa at a high temperature of 250° C., being not suitable for long-term high-temperature services. The pressure/gravity casting method adopted is slow in solidification, and easily produces defects such as segregation and shrinkage porosity, which reduce the quality stability and affect the performance.

The metal powder used in additive manufacturing is a high-quality powder with a high net value, and its range of application and demand has gradually expanded in recent years. For aluminum alloy for additive manufacturing, the main preparation methods of the metal powder for additive manufacturing include water atomization, plasma atomization and rotation electrode processes. The currently used aluminum alloy powders mainly include Al—Si alloys, such as AlSi10Mg, AlSi7Mg0.6, AlSi9Cu3, etc., which are simple in composition, but poor in heat resistance, being not suitable for high-temperature services, or have high density, being disadvantageous to the development of lightweight, so that the application is greatly limited. Studies have found that $Al_1Ce_3$, $Al_3Zr$, $Al_3Y$, $Al_3Sc$ and other intermetallic compounds have the ability to hinder dislocation motions and grain boundary sliding, so that the thermal stability and high temperature strength of the materials may be improved. The higher the melting point, the finer the size, the more complex the composition and structure, the better the strengthening effect. Therefore, uniform distribution of the intermetallic compounds in the matrix is critical to improve the heat resistance of the alloy. With the rapid development in the fields of ocean engineering, automobiles, rail transit and aerospace, the demand on the metal powder applicable for additive manufacturing is also growing rapidly. At present, the metal powders are largely homogeneous, with fewer species, limited functions and a small application range. A heat-resistant aluminum alloy powder applicable for additive manufacturing, especially a heat-resistant rare earth aluminum alloy powder with excellent performance and a preparation method thereof have not been reported.

SUMMARY OF THE INVENTION

In view of the defects in the prior art, an object of the present disclosure is to provide a rare earth aluminum alloy powder applicable for additive manufacturing and a preparation method thereof.

In a first aspect of the present disclosure, a method for preparing a rare earth aluminum alloy powder applicable for additive manufacturing is provided. The method includes the following steps:

S1, heating and melting aluminum ingots into an aluminum melt at a temperature of 730° C. to 780° C. in presence of a protective atmosphere;

S2, adding required alloy elements to the aluminum melt to obtain an alloy melt: adjusting a proportion of each element with an intermediate alloy, and performing degassing and deslagging so that the alloy elements are present in the following preset percentages by weight: 1.00% to 10.00% of Ce, 0.05% to 8.00% of Mg, 0.10% to 7.50% of Y is, 0.10% to 2.50% of Zr, less than 0.1% of impurities, and the balance aluminum; a composition error being less than 0.02%.

S3, leading out the alloy melt through a fluid guiding pipe, and impacting the alloy melt with a high-pressure gas flow at an outlet of the fluid guiding pipe, so that the alloy melt is atomized into fine droplets under an action of surface tension, and solidified into spherical alloy powder; and S4, collecting the spherical alloy powder in a vacuum collector, and screening and drying the spherical alloy powder to obtain the rare earth aluminum alloy powder applicable for additive manufacturing.

Preferably, in step S2, the alloy elements are present in the following preset percentages by weight: 6.00% to 8.00% of Ce, 0.40% to 1.00% of Mg, 0.10% to 0.25% of Y, 0.10% to 0.25% of Zr, less than 0.1% of impurities, and the balance being aluminum.

Preferably, in step S3 of leading out the alloy melt through the fluid guiding pipe, a lead-out temperature of the alloy melt is controlled between 630° C. and 680° C.

Preferably, in step S3 of leading out the alloy melt is led out through the fluid guiding pipe, a lead-out velocity of the alloy melt is between 5 kg/min and 10 kg/min.

Preferably, in step S3 of leading out the alloy melt through the fluid guiding pipe, the fluid guiding pipe is made of zirconium oxide, silicon nitride or titanium nitride; a diameter of the fluid guiding pipe is 2 mm to 6 mm.

Preferably, in step S3, the alloy melt is impacted with a high-pressure gas flow at a pressure of 6 MPa to 8 MPa.

Preferably, the spherical alloy powder has an average particle size of 40 μm to 50 μm and a particle size distribution of 10 μm to 75 μm.

In a second aspect of the present disclosure, a rare earth aluminum alloy powder applicable for additive manufacturing, prepared by the method described above, is provided.

Preferably, the rare earth aluminum alloy powder has a degree of sphericity of greater than 95%, and contains less than 0.1% of satellite powder and hollow powder. The rare earth aluminum alloy powder has a high degree of sphericity, and contains less satellite powder and hollow powder, and can meet the use requirements of different printing conditions in additive manufacturing.

Preferably, the rare earth aluminum alloy powder has a true density of 2.70 g/cm$^3$ to 2.82 g/cm$^3$; the rare earth aluminum alloy powder has an apparent density of greater than 1.5 g/cm$^3$. The rare earth aluminum alloy powder has a high apparent density.

Preferably, the rare earth aluminum alloy powder has an oxygen and nitrogen content of lower than 200 ppm.

Preferably, the rare earth aluminum alloy powder has a Hall flow rate of 46 s/50 g to 50 s/50 g. The rare earth aluminum alloy powder has favorable fluidity and good printing performance.

Compared to the prior art, the present disclosure has at least one of the following beneficial effects.

The preparation method of the present disclosure described above adopts gas atomization in the preparation of power, so that the cost of gas is low, the process is simple, and the particle size distribution and quality of the powder can be changed by adjusting the parameters such as the superheat temperature of the metal melt, ratio of gas to melt, velocity of the gas flow, and gas pressure; and the prepared powder is applicable for various additive manufacturing processes such as selective laser sintering, selective laser melting, and electron beam melting.

The preparation method of the present disclosure integrates the steps of alloy smelting, composition control and powder preparation into one, and the alloy is not heated for the second time for remelting, thus reducing the melting loss of the elements. The high-purity argon can be recycled and reused with low energy consumption, causing no environmental pollution. The rare earth aluminum alloy powder applicable for additive manufacturing prepared according to the present disclosure has the features of high sphericity, less satellite powder and hollow powder, low oxygen content and high apparent density, and can meet the use requirements of different printing conditions in additive manufacturing.

The rare earth aluminum alloy powder of the present disclosure contains elements of Ce, Y and Zr, and by using the rapid solidification technology of additive manufacturing, $Al_{11}Ce_3$ and $Al_3$ (Y, Zr) phases can be formed in the aluminum matrix with uniform distribution at the nanometer scale. These nanophases have high melting points and are not easily melted and coarsened at high temperature, so that the thermal stability and high-temperature performance of the alloy can be significantly improved, and the problems of single composition, poor heat resistance and small selection range of species of the existing aluminum alloy powder are solved.

The above-mentioned rare earth aluminum alloy powder prepared according to the present disclosure has excellent fluidity and printing performance, is applicable for additive manufacturing and can be effectively used for parts with large volume, light weight and complicated structure, offering great application prospects in the fields of weight-sensitive applications and aerospace. The processing cycle is greatly shortened, the production efficiency is improved, and the technological process is simplified.

BRIEF DESCRIPTION OF THE DRAWINGS

Other features, objects and advantages of the present disclosure will become more apparent from reading the detailed description of non-limiting embodiments with reference to the accompanying drawings.

DETAILED DESCRIPTION OF THE INVENTION

Hereinafter, the present disclosure will be described in detail with reference to specific embodiments. The following embodiments will aid those skilled in the art in further understanding of the present disclosure, but do not limit the present disclosure in any way. It should be noted that several variations and modifications can be made by a person skilled in the art without departing from the inventive concept. These are all within the protection scope of the present disclosure.

Embodiment 1

In this embodiment, a rare earth aluminum alloy powder applicable for additive manufacturing is provided. The rare earth aluminum alloy powder includes the following elements in percentages by weight: 10.00% of Ce, 0.60% of Mg, 0.10% of Y, 0.25% of Zr, less than 0.1% of impurities, and the balance aluminum.

The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 750° C. in presence of protective high-purity argon.

In step S2, required alloy elements were added to the aluminum melt, a proportion of each element was adjusted with an intermediate alloy, and degassing and deslagging were performed so that the elements were present as follows: 10.00% of Ce, 0.60% of Mg, 0.10% of Y, 0.25% of Zr, and the balance aluminum, with a composition error of less than 0.02%, thereby obtaining an alloy melt.

In step S3, the alloy melt was led out through a zirconium oxide fluid guiding pipe with a diameter of 2 mm from the bottom of the electric induction furnace, and the fluid guiding pipe was controlled to heat, where the lead-out temperature was maintained at 650° C., and a lead-out velocity of the alloy melt was 5 kg/min; and the alloy melt was impacted with a high-pressure argon flow at a pressure of 6 MPa with a purity of greater than 99.99%, so that the alloy melt was atomized into fine droplets, and solidified into spherical particles to obtain an alloy powder.

Figure 1:
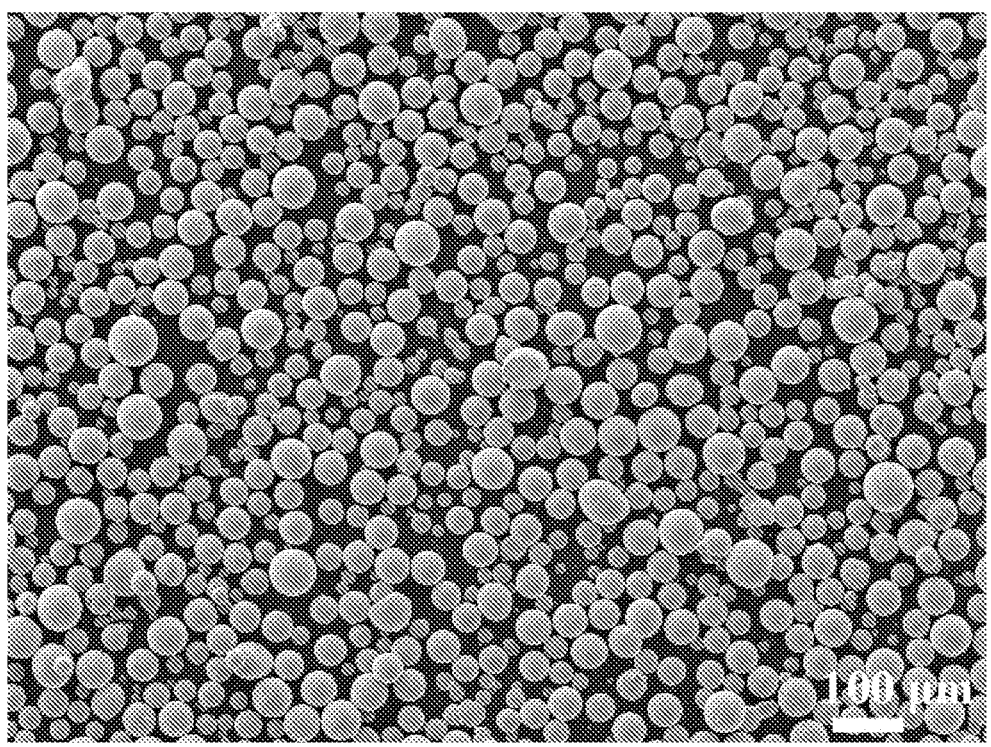
FIG. 1 is a micro morphology diagram of a rare earth aluminum alloy powder applicable for additive manufacturing of a preferred embodiment of the present disclosure.
Figure 2:
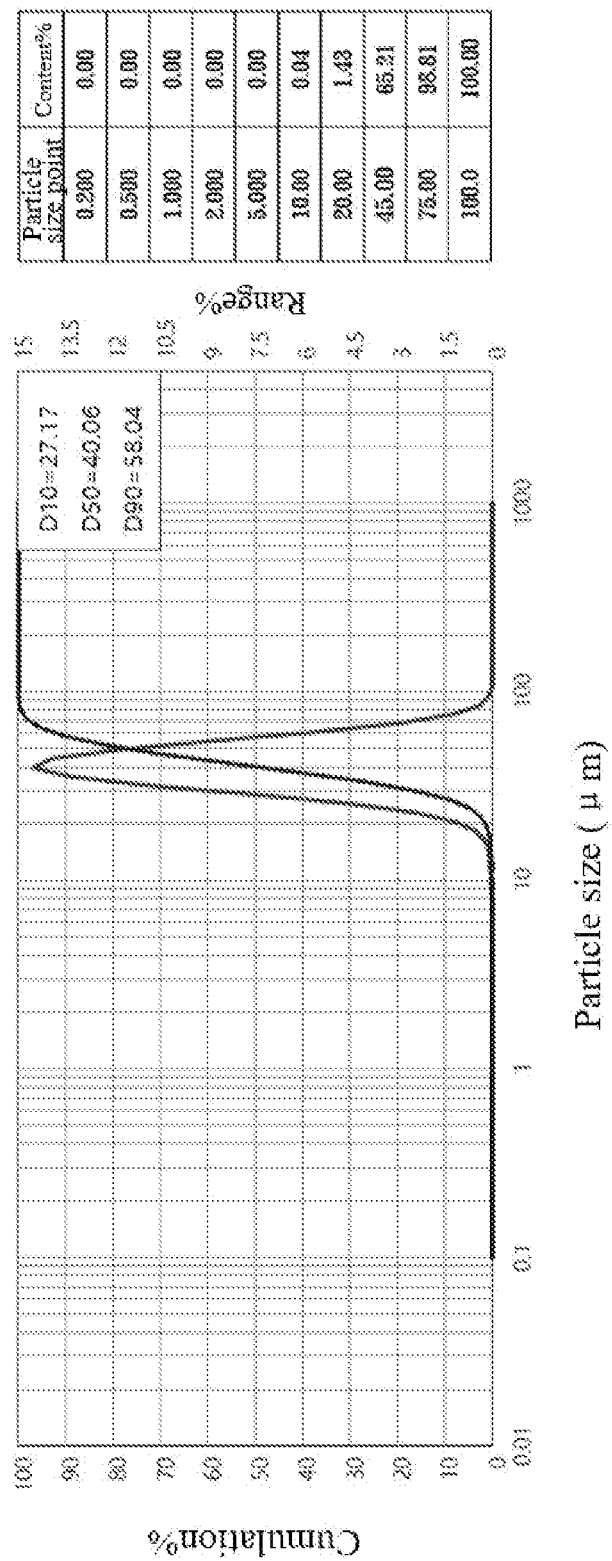
FIG. 2 is a particle size distribution diagram of a rare earth aluminum alloy powder applicable for additive manufacturing of a preferred embodiment of the present disclosure.

In step S4, the spherical particles were collected in a vacuum collector, and subjected to screening and drying, and then packaged to obtain a powder product. By tests, the obtained alloy powder has an average particle size of 43 μm and a particle size distribution of 20 μm to 60 μm, where d(10)=27.17 μm, d(50)=40.06 μm, d(90)=58.04 μm, and a Hall flow rate of 46.7 s/50 g. The micro morphology diagram of the alloy powder is shown in FIG. 1, and the particle size distribution is shown in FIG. 2.

Embodiment 2

In this embodiment, a rare earth aluminum alloy powder applicable for additive manufacturing is provided. The rare earth aluminum alloy powder includes the following elements in percentages by weight: 8.00% of Ce, 0.40% of Mg, 0.10% of Y, 2.50% of Zr, less than 0.1% of impurities, and the balance aluminum.

The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 730° C. in presence of protective high-purity argon.

In step S2, required alloy elements were added to the aluminum melt, a proportion of each element was adjusted with an intermediate alloy, and degassing and deslagging were performed so that the elements were present as follows: 8.00% of Ce, 0.40% of Mg, 0.10% of Y, 2.50% of Zr, and the balance aluminum, with composition error of less than 0.02%, thereby obtaining an alloy melt.

In step S3, the alloy melt was led out through a titanium nitride fluid guiding pipe with a diameter of 4 mm from the bottom of the electric induction furnace, and the fluid guiding pipe was controlled to heat, where the lead-out temperature was maintained at 650° C., and a lead-out velocity of the alloy melt was 5 kg/min; and the alloy melt was impacted with a high-pressure argon flow at a pressure of 8 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product. By tests, the obtained alloy powder has an average particle size of 43.4 μm and a particle size distribution of 20 μm to 75 μm, where d(10)= 23.11 μm, d(50)=42.66 μm, d(90)=75.42 μm, and a Hall flow rate of 46 s/50 g.

Embodiment 3

In this embodiment, a rare earth aluminum alloy powder applicable for additive manufacturing is provided. The rare earth aluminum alloy powder includes the following elements in percentages by weight: 10.00% of Ce, 0.60% of Mg, 0.10% of Y, 0.20% of Zr, less than 0.1% of impurities, and the balance aluminum. The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 780° C. in presence of protective high-purity nitrogen.

In step S2, required alloy elements were added to the aluminum melt, a proportion of each element was adjusted with an intermediate alloy, and degassing and deslagging were performed so that the elements were present as follows: 10.00% of Ce, 0.60% of Mg, 0.10% of Y, 0.20% of Zr, and the balance aluminum, with a composition error of less than 0.02%, thereby obtaining an alloy melt.

In step S3, the alloy melt was led out through a zirconium oxide fluid guiding pipe with a diameter of 6 mm from the bottom of the electric induction furnace, and the fluid guiding pipe was controlled to heat, where the lead-out temperature was maintained at 660° C., and a lead-out velocity of the alloy melt was 6 kg/min; and the alloy melt was impacted with a high-pressure nitrogen flow at a pressure of 7 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product.

By tests, the obtained alloy powder has an average particle size of 42.6 μm and a particle size distribution of 22 μm to 73 μm, where d(10)=28.13 μm, d(50)=42.11 μm, d(90)=73.18 μm, and a Hall flow rate of 47 s/50 g.

Embodiment 4

In this embodiment, a rare earth aluminum alloy powder applicable for additive manufacturing is provided. The rare earth aluminum alloy powder includes the following elements in percentages by weight: 8.00% of Ce, 0.60% of Mg, 0.20% of Y, 0.50% of Zr, less than 0.1% of impurities, and the balance aluminum.

The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 750° C. in presence of protective high-purity argon.

In step S2, required alloy elements were added to the aluminum melt, a proportion of each element was adjusted with an intermediate alloy, and degassing and deslagging were performed so that the elements were present as follows: 8.00% of Ce, 0.60% of Mg, 0.20% of Y, 0.50% of Zr, and the balance aluminum, with a composition error of less than 0.02%, thereby obtaining an alloy melt.

In step S3, the alloy melt was led out through a titanium nitride fluid guiding pipe with a diameter of 4 mm from the bottom of the electric induction furnace, and the fluid guiding pipe was controlled to heat, where the lead-out temperature was maintained at 660° C., and a lead-out velocity of the alloy melt was 7 kg/min; and the alloy melt was impacted with a high-pressure argon flow at a pressure of 7 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product. By tests, the obtained alloy powder has an average particle size of 46.8 μm and a particle size distribution of 20 μm to 70 μm, where d(10)=17.87 μm, d(50)=46.09 μm, d(90)=68.02 μm, and a Hall flow rate of 46.3 s/50 g.

Embodiment 5

In this embodiment, a rare earth aluminum alloy powder applicable for additive manufacturing is provided. The rare earth aluminum alloy powder includes the following elements in percentages by weight: 10.00% of Ce, 0.50% of Mg, 0.20% of Y, 2.50% of Zr, less than 0.1% of impurities, and the balance aluminum. The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 760° C. in presence of protective high-purity argon.

In step S2, required alloy elements were added to the aluminum melt, a proportion of each element was adjusted with an intermediate alloy, and degassing and deslagging were performed so that the elements were present as follows: 10.00% of Ce, 0.50% of Mg, 0.20% of Y, 2.50% of Zr, and the balance aluminum, with a composition error of less than 0.02%, thereby obtaining an alloy melt.

In step S3, the alloy melt was led out through a zirconium oxide fluid guiding pipe with a diameter of 6 mm from the bottom of the electric induction furnace, and the fluid guiding pipe was controlled to heat, where the lead-out temperature was maintained at 670° C., and a lead-out velocity of the alloy melt was 7 kg/min; and the alloy melt was impacted with a high-pressure argon flow at a pressure of 8 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product.

By tests, the obtained alloy powder has an average particle size of 47 μm and a particle size distribution of 20 μm to 75 μm, where d(10)=20.18 μm, d(50)=46.06 μm, d(90)=70.04 μm, and a Hall flow rate of 47 s/50 g.

Embodiment 6

In this embodiment, a rare earth aluminum alloy powder applicable for additive manufacturing is provided. The rare earth aluminum alloy powder includes the following elements in percentages by weight: 1.00% of Ce, 0.05% of Mg, 7.50% of Y, 0.10% of Zr, less than 0.1% of impurities, and the balance aluminum.

The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 780° C. in presence of protective high-purity argon.

In step S2, required alloy elements were added to the aluminum melt, a proportion of each element was adjusted with an intermediate alloy, and degassing and deslagging were performed so that the elements were present as follows: 1.00% of Ce, 0.05% of Mg, 7.50% of Y, 0.10% of Zr, and the balance aluminum, with a composition error of less than 0.02%, thereby obtaining an alloy melt.

In step S3, the alloy melt was led out through a zirconium oxide fluid guiding pipe with a diameter of 4 mm from the bottom of the electric induction furnace, and the fluid guiding pipe was controlled to heat, where the lead-out temperature was maintained at 660° C., and a lead-out velocity of the alloy melt was 5 kg/min; and the alloy melt was impacted with a high-pressure argon flow at a pressure of 8 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product. By tests, the obtained alloy powder has an average particle size of 40.6 μm and a particle size distribution of 15 μm to 55 μm, where d(10)=15.18 μm, d(50)=40.61 μm, d(90)=56.77 μm, and a Hall flow rate of 47.1 s/50 g.

Embodiment 7

In this embodiment, a rare earth aluminum alloy powder applicable for additive manufacturing is provided. The rare earth aluminum alloy powder includes the following elements in percentages by weight: 6.00% of Ce, 8.00% of Mg, 7.50% of Y, 0.10% of Zr, less than 0.1% of impurities, and the balance aluminum. The above-mentioned rare earth aluminum alloy powder applicable for additive manufacturing may be prepared by the following method. The method includes the following steps.

In step S1, aluminum ingots were heated and melted into an aluminum melt in an electric induction furnace at a temperature of 760° C. in presence of protective high-purity argon.

In step S2, required alloy elements were added to the aluminum melt, a proportion of each element was adjusted with an intermediate alloy, and degassing and deslagging were performed so that the elements were present as follows: 6.00% of Ce, 8.00% of Mg, 7.50% of Y, 0.10% of Zr, and the balance aluminum, with a composition error of less than 0.02%, thereby obtaining an alloy melt.

In step S3, the alloy melt was led out through a zirconium oxide fluid guiding pipe with a diameter of 6 mm from the bottom of the electric induction furnace, and the fluid guiding pipe was controlled to heat, where the lead-out temperature was maintained at 670° C., and a lead-out velocity of the alloy melt was 5 kg/min; and the alloy melt was impacted with a high-pressure argon flow at a pressure of 8 MPa with a purity of greater than 99.99%, so that the alloy melt was atomized into fine droplets, and solidified into spherical particles to obtain an alloy powder.

In step S4, the alloy powder was collected in a vacuum collector, and subjected to screening and drying, and then packaged to obtain a powder product. By tests, the obtained alloy powder has an average particle size of 45 μm and a particle size distribution of 20 μm to 55 μm, where d(10)=20.18 μm, d(50)=45.06 μm, d(90)=60.04 μm, and a Hall flow rate of 47 s/50 g.

The rare earth aluminum alloy powder applicable for additive manufacturing provided in the above-mentioned embodiments has the features of high sphericity, less satellite powder and hollow powder, high apparent density and low nitrogen and oxygen content. The powder material has excellent fluidity and printing performance, is applicable for additive manufacturing and can be effectively used for parts with large volume, light weight and complicated structure.

The problems of single composition, poor heat resistance, high density and application limitation of the existing aluminum alloy powder applicable for additive manufacturing are solved, promoting the development of heat-resistant rare earth aluminum alloy powder, and the defects such as application limitation of the existing aluminum alloy powder are overcome, promoting the use of rare earth aluminum alloy powder in weight sensitive applications and aerospace applications.

Specific embodiments of the present disclosure have been described above. It is to be understood that the present disclosure is not limited to the particular embodiments described above, and that various changes and modifications may be made by those skilled in the art within the scope of the art without affecting the spirit of the present disclosure.

What is claimed is:

1. A method for preparing a rare earth aluminum alloy powder applicable for additive manufacturing, comprising the following steps:
   S1, heating and melting aluminum ingots into an aluminum melt at a temperature of 730° C. to 780° C. in presence of a protective atmosphere;
   S2, adding required alloy elements to the aluminum melt to obtain an alloy melt: adjusting a proportion of each element with an intermediate alloy, and performing degassing and deslagging so that the alloy elements are present in the following preset percentages by weight: 6.00% to 8.00% of Ce, 0.40% to 1.00% of Mg, 0.10% to 0.25% of Y, 0.10% to 0.25% of Zr, less than 0.1% of impurities, and the balance being aluminum;
   S3, leading out the alloy melt through a fluid guiding pipe, and impacting the alloy melt with a gas flow at an outlet of the fluid guiding pipe, so that the alloy melt is atomized into fine droplets under an action of surface tension, and solidified into spherical alloy powder; and
   S4, collecting the spherical alloy powder in a vacuum collector, and screening and drying the spherical alloy powder to obtain the rare earth aluminum alloy powder applicable for additive manufacturing.

2. The method according to claim 1, wherein in step S3 of leading out the alloy melt through the fluid guiding pipe,
   a lead-out temperature of the alloy melt is controlled between 630° C. and 680° C.;
   a lead-out velocity of the alloy melt is between 5 kg/min and 10 kg/min;
   the fluid guiding pipe is made of zirconium oxide, silicon nitride or titanium nitride; a diameter of the fluid guiding pipe is 2 mm to 6 mm.

3. The method according to claim 1, wherein in step S3, the alloy melt is impacted with a high-pressure argon flow or a high-pressure nitrogen flow at a pressure of 6 MPa to 8 MPa.

4. The method according to claim 1, wherein the spherical alloy powder has an average particle size of 40 μm to 50 μm and a particle size distribution of 10 μm to 75 μm.

* * * * *